(No Model.)

E. H. PECK.
MACHINE FOR MAKING AND AFFIXING TAGS TO PLUG TOBACCO.

No. 306,948. Patented Oct. 21, 1884.

Fig 1

WITNESSES=

INVENTOR
Eugene H Peck
By A. P. Thayer
atty (No Model.) 7 Sheets—Sheet 3.

E. H. PECK.

MACHINE FOR MAKING AND AFFIXING TAGS TO PLUG TOBACCO.

No. 306,948. Patented Oct. 21, 1884.

(No Model.) 7 Sheets—Sheet 4.

E. H. PECK.
MACHINE FOR MAKING AND AFFIXING TAGS TO PLUG TOBACCO.

No. 306,948. Patented Oct. 21, 1884.

WITNESSES:
O. Morgan
S. H. Morgan

INVENTOR
Eugene H. Peck
By A. P. Thayer
atty (No Model.) 7 Sheets—Sheet 5.

E. H. PECK.
MACHINE FOR MAKING AND AFFIXING TAGS TO PLUG TOBACCO.

No. 306,948. Patented Oct. 21, 1884.

WITNESSES:

INVENTOR:
Eugene H. Peck
By A. P. Thayer
atty (No Model.)

E. H. PECK.
MACHINE FOR MAKING AND AFFIXING TAGS TO PLUG TOBACCO.

No. 306,948. Patented Oct. 21, 1884.

WITNESSES:

INVENTOR:
Eugene H. Peck,
By A. P. Thayer
atty (No Model.) 7 Sheets—Sheet 7.
E. H. PECK.
MACHINE FOR MAKING AND AFFIXING TAGS TO PLUG TOBACCO.
No. 306,948. Patented Oct. 21, 1884.

WITNESSES: INVENTOR:
Eugene H. Peck,
By A. P. Thayer
atty

UNITED STATES PATENT OFFICE.

EUGENE H. PECK, OF GREENVILLE, ASSIGNOR OF ONE-HALF TO ROBERT MORRELL, OF SUMMIT, NEW JERSEY.

MACHINE FOR MAKING AND AFFIXING TAGS TO PLUG-TOBACCO.

SPECIFICATION forming part of Letters Patent No. 306,948, dated October 21, 1884.

Application filed December 1, 1883. (No model.)

*To all whom it may concern:*

Be it known that I, EUGENE H. PECK, a citizen of the United States, residing at Greenville, in the county of Hudson and State of New Jersey, have invented new and useful Improvements in Machines for Making and Affixing Tags to Plug-Tobacco, of which the following is a specification.

My invention consists of improvements in mechanism whereby tin tags for plug-tobacco may be automatically made and affixed to the plugs, the tin sheets being applied to the machine and the tobacco-plugs being supplied to and removed from the machine by hand. The said improved mechanism comprises a power-punch for cutting out the blanks, a point-bending press for setting the points of the tags for being forced into the tobacco-plugs, a press for forcing the points of the tags into the tobacco, and thereby affixing said tags to the same, and an annular and intermittingly-rotating die-plate, in which the tags are transferred from the punching-press to the point-bending press, bent thereby, and again transferred to the affixing-press, all organized in an automatic machine in which the requisite number of tags for two large plugs may be punched out, and a similar number may have the points bent, and a third batch may be affixed to the tobacco-plugs by one operation of the machine, so that large plugs being subsequently cut into eight small plugs, each having one tag, makes sixteen tags made and as many plugs tagged at once, which effects a considerable economy of labor, not only in the making of the tags and affixing them, but a considerable saving of intermediate work— such as packing the tags, unpacking, and feeding them—which has to be done when the tags are made and applied separately, all as hereinafter fully described, reference being made to the accompanying drawings, in which—

I make a circular table, $a$, and mount it on any suitable legs, $b$, for supporting the mechanism, and arrange the annular die-plate $c$ in a wide and shallow groove, $d$, in the upper surface of the table, in which die-plate I make, preferably, eight sets of die-sockets, $e$, each set being in two parallel and straight rows of eight (more or less) sockets each, and the sets of die-sockets being located equal distances apart around the die-plate. To the under side of this die-plate I attach as many feeding studs or brackets $f$ as the number of movements the die-plate makes in a revolution, and I arrange a feeding-lever, $g$, therewith, to shift the die-plate from one position to another in succession of the operations of the tag forming and affixing devices. The feed-studs $f$ have an inclined side, $h$, and the feeding-arm $g$ has a sliding catch, $i$, in it, the outer end of which catch is beveled at $j$ to correspond with the incline $h$ and bear thereon when the arm swings back to engage the studs for shifting the die-plate, whereby said catch $i$ is pushed back against a spring, $k$, when the catch passes to the rear of the feeding-studs. The spring $k$ then pushes the catch $i$ out behind the stud, and causes said catch to engage the stud for shifting the die-plate forward by the forward swing of the feeding-lever. The said lever is pivoted to a stud, $l$, under the center of the table, to swing concentrically with the die-plate, and is connected by rod $m$ with a crank-pin, $n$, on a disk, $o$, attached to the lower end of a vertical shaft, $p$, extending up through the table in a suitable bearing-stud, $q$, and gearing by toothed wheels $s$ with the main shaft $t$, which cause the feed-arm to make one throw for every revolution of the main shaft. The sliding catch-block $i$ is suitably fitted in a groove of the arm for sliding back and forth therein, and is secured by a cover-plate, $r$, bolted on the top of the arm over the groove, and said catch has a rod, $x$, extending along the arm into the socket $y$ of the hub of the arm, to support the spring $k$, which is employed to push the catch forward. The rod $x$ slides in and out of the socket, according as the catch $i$ shifts. The groove $d$ of the table is deepened in the central portion $d'$, to provide space for the feeding-studs $f$ to move in, and where the feed-arm $g$ swings, the table is constructed without the inner wall, $z$, from $a'$ to $a'$ of the said depressed portion in which this groove $d'$ is formed, to make the proper opening for the arm $g$, which is mainly below the under surface of the table, to reach into the groove $d'$ to engage the feed-studs; but along the lower edge of the bottom plate, $b'$, of the table a ledge, $c'$, is formed, over which the outer end of the arm $g$ swings to be supported thereat.

The power-press for punching out the tags $c'$ from the tin sheets $f'$ consists of the vertically-reciprocating punch-stock $g'$, carrying the punches $h'$, and the stationary bed-die $i'$, the punch-stock being arranged in the ways $j'$, and geared with the main driving-shaft $t'$ by the eccentric $k'$ and the sliding block $l'$, and the bed-die $i'$ being suitably attached to the table $a$ to allow the die-plate $c$ to move freely under it.

Figure 4:
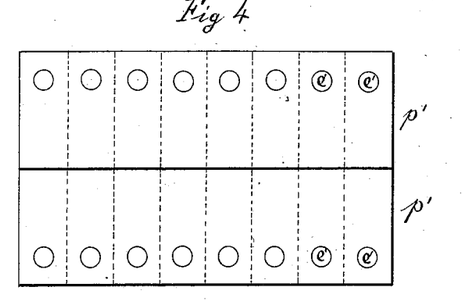
Fig. 4 is a plan view of a couple of large plugs of tobacco, with the tags as affixed by my improved machine.
Figure 5:
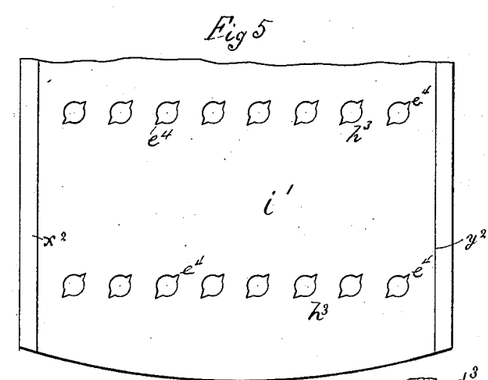
Fig. 5 is a plan of the bed-die of the punching-press, in which the tags are punched, showing the form of the tags.
Figure 6:
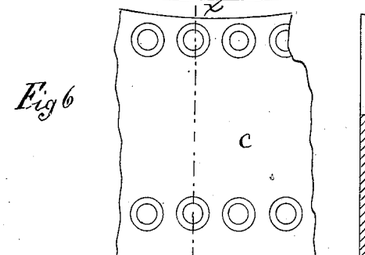
Fig. 6 is a plan of a portion of the annular die-plate, in which the tags are carried from the punching-press to the point-bender and to the tagging devices.
Figure 7:
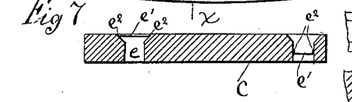
Fig. 7 is a section of Figs. 1 and 6 on the line $x\,x$.
Figure 8:
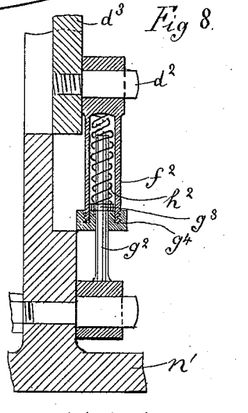
Fig. 8 is a detail of the tagging devices in section.
Figures 9, 10:
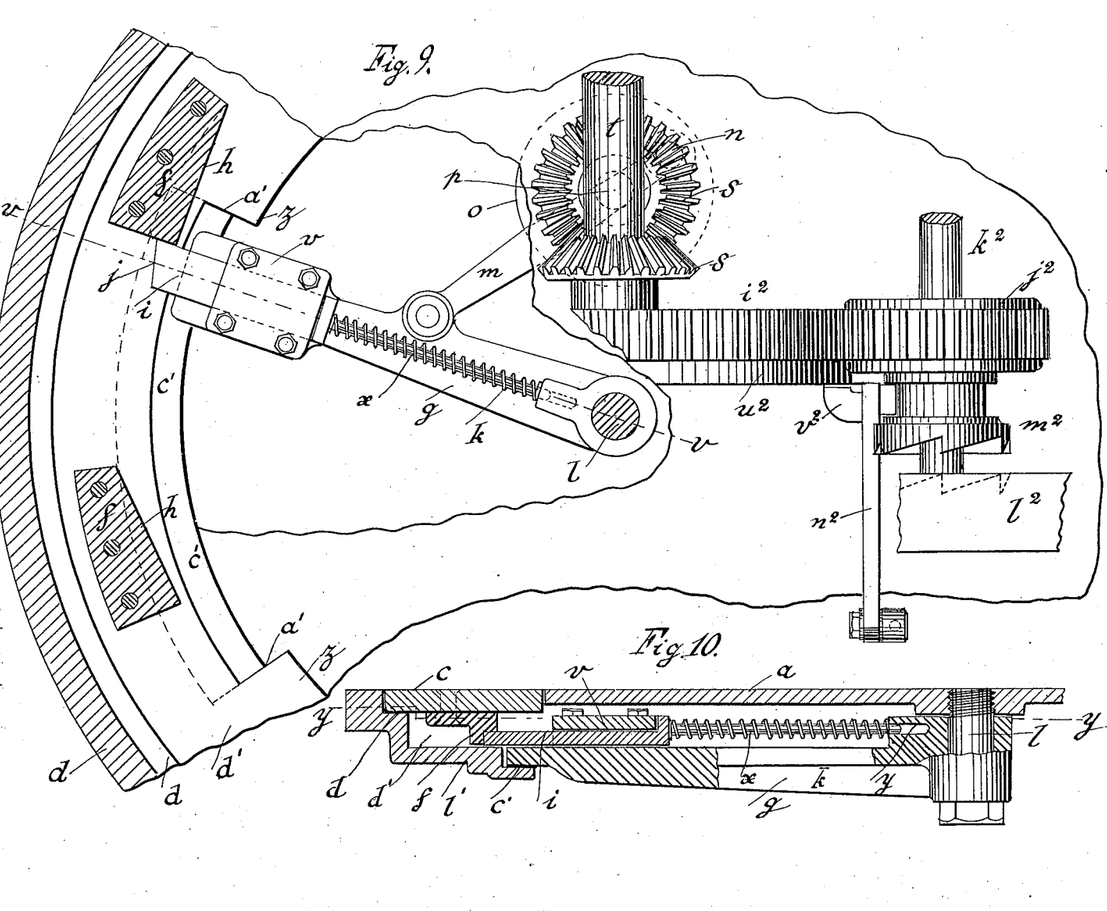
Fig. 9 is a detail, partly in plan view and partly in horizontal section, as indicated by the line $y\,y$ of Fig. 10.
Fig. 10 is a detail in vertical section on line $v\,v$ of Fig. 9.
Figures 11, 12:
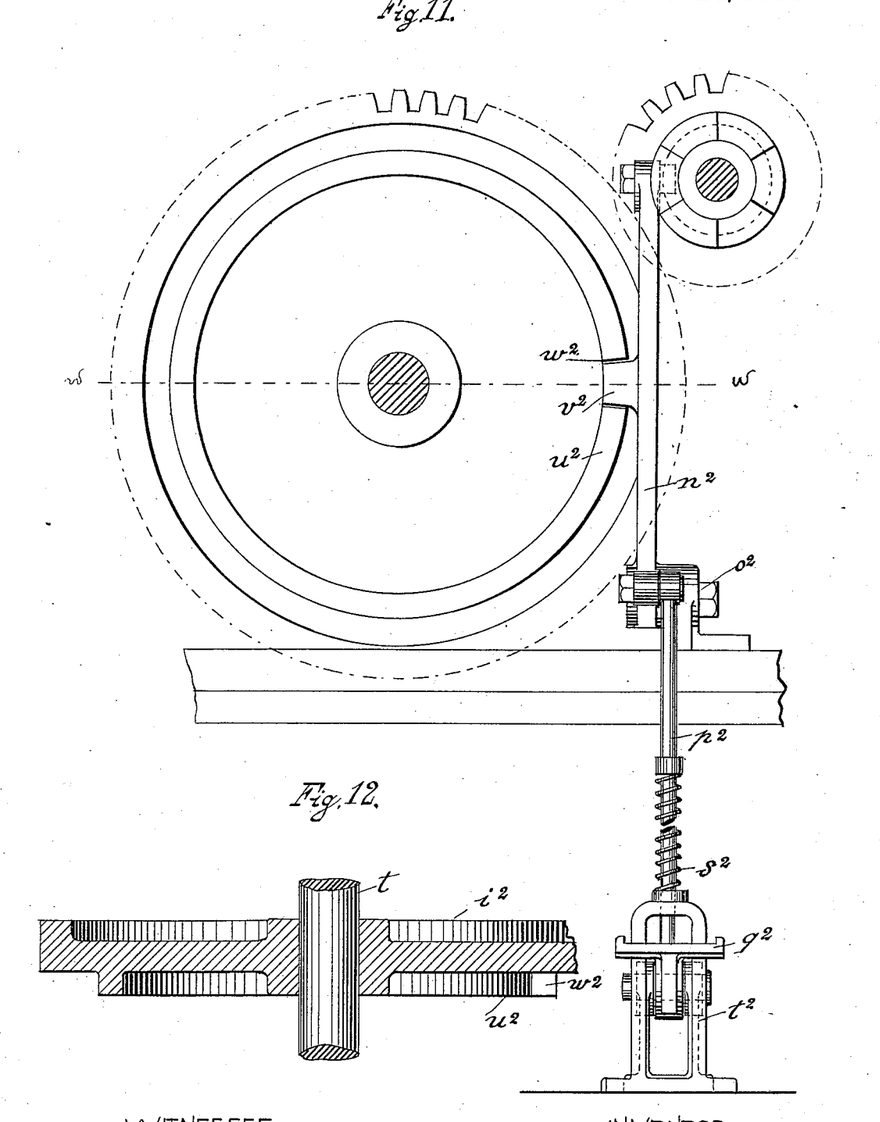
Fig. 11 is a detail in elevation.
Fig. 12 is a horizontal section of the main wheel on line $w\,w$ of Fig. 11.
Figure 13:
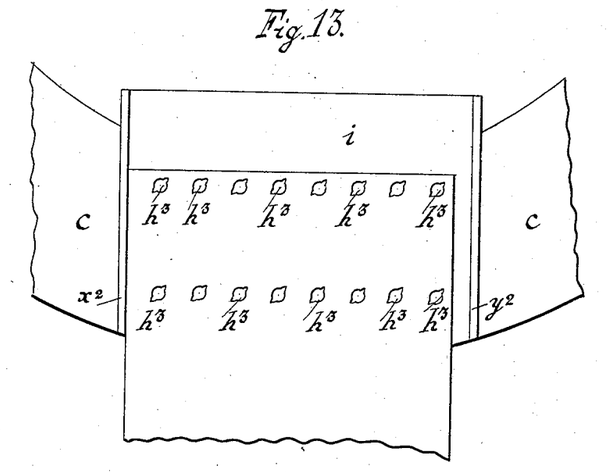
Figs. 13 and 14 are details illustrating the method of feeding the blank sheets to the punches, by which the tags are cut out of said blanks.

The punches $h'$ and the corresponding die-holes, $h^3$, of the bed-die $i'$ are alike in number and arrangement with the die-sockets $e$ of the several sets of said die-sockets in said die-plate, and coincide with the sockets of any set resting under the punches; but the punches $h'$ and the die-holes $h^3$ of the bed-die $i'$ have ribs and nicks $c^4$, respectively, to make the tag-disk $c'$ and its points $c^2$, while the form of the die-sockets $e$ in the lower portion corresponds with the disk of the tag, and the upper part is countersunk (see Fig. 6) sufficiently to receive the tags from the bed-die $i'$ and carry and hold them by the points under the point-bending punches $l^3$ of the reciprocating head $m'$, located a quarter of the circumference of the die-plate $c$ away from the punching-press—that is to say, two removes of the die-plate from the punches. These punches $l^3$ press the tags down in the die-sockets $e$ about half-way through the die-plate, bending the points upward at right angles to the plane of the disks, (see Fig. 7,) where the friction of the disks and points of the tags against the walls of the die-sockets retain the tags in the die-sockets while they are carried another quarter of a revolution of the die-plate to the place where they are to be inserted in the tobacco-plugs—that is, under the presser $n'$. Here a couple of long plugs, $p'$, of tobacco are placed side by side under said presser by an attendant when the presser is up, and then, after the presser goes down, the punches $q'$, attached to the head $s'$ under the table, are thrust upward through the table and through the die plate $c$, forcing the points of the tags into the tobacco against the presser $n'$, thus affixing the tags, one of the lines or rows being affixed to one of the plugs, respectively, lengthwise of the same, so that when the plugs are subsequently divided transversely between each tag into short plugs each of the said short plugs will have a tag duly affixed to it, as represented in Fig. 4. Directly after the tags are thus affixed the presser $n'$ rises clear of the tobacco-plugs, which are then carried forward with the die-plate for removal therefrom by another attendant, who punches or brushes them off at the next quarter position of the table. The punch-stock $m'$ is attached to a lever, $t'$, that is pivoted in the standard $u'$, and has a roller, $v'$, which runs on a cam, $w'$, on the main shaft $t$, to be operated for forcing down the bending-punches $l^3$. A spring or other approved device may be employed for raising said punches. The affixing-punches $q'$ are forced up to affix the tags to the tobacco-plugs by the cam $x'$ on the driving-shaft $t$, which acts on a roller, $y'$, pivoted on the upper end of the yoke-rod $z'$, which straddles the shaft for its guide at the upper end, and is connected at the lower end with the lever $a^2$, pivoted to a bracket at $b^2$, and bearing against the lower end of the punch-stock slide $c^2$. The weight of the punch-stock $s'$ causes it to fall for withdrawing the punches; or a spring or other means may be employed to force it down. The presser $n'$ is connected to the crank-pin $d^2$ by an extensible connecting rod, consisting of sleeve $f^2$, rod $g^2$, and a spring, $h^2$, contrived to raise the presser high enough for the tobacco-plugs to be placed under it readily, and so that when the presser descends on the plugs it will bear on them alike, whether thick or thin, by the pressure of the spring, which will yield suitably for the swing of the crank-pin. The crank-pin is attached to a disk, $d^3$, on the shaft $t$. The rod $g^2$ has a collar, $g^3$, inside of the sleeve $f^2$, that is engaged by an internal ring, $g^4$; or it may be a stud-pin or other device of the sleeve to raise the presser; or the same may be effected by the pull of the spring, which may be connected at one end to the sleeve near the upper end of the socket, and connected at the other end to the rod $g^2$ near the lower end of the sleeve; but the collar on the rod $g^2$ and ring or stud in the sleeve will probably be the best. The shaft $t$, by which these several punching devices are operated, is geared by the large spur-wheel $i^2$ with the pinion $j^2$ on the driving-shaft $k^2$, to which the power is applied by a belt on the loose pulley $l^2$, which is to be connected by the clutch $m^2$ when the machine is to be set in motion. The clutch is connected with the bell-crank shifter $n^2$, pivoted to the frame at $o^2$, and connected by the rod $p^2$ with the foot-lever $q^2$, which is to be forced down and held by the attendant of the power-punch while the machine is to be kept in motion. A spring, $s^2$, is arranged on the rod $p^2$, and with the bell-crank shifter $n^2$ and stand $t^2$ to throw up the bell-crank and foot-lever and disconnect the clutch when the machine is to be stopped.

To insure the stopping of the machine with the punches $h'$ and $l^3$ up and the punches $q'$ down, so as to always enable the tin sheet and the tobacco-plugs to be removed, and for other reasons, I have arranged a plain ring, $w^2$, on the side of the spur-wheel $i^2$ next to the bell-crank shifter $n^2$, so that a stud, $v^2$, on the shifter will bear against the ring to prevent the clutch from disconnecting until a notch, $w^2$, in said ring comes to the stnd $v^2$, which will then fall into said notch and allow the clutch to disconnect, and it also stops the machine. The notch is so arranged on the wheel that it comes to the stud $v^2$, when the punches are in the positions where it is desired to stop them, and thus the machine will only stop when the several parts are in their proper places. It is to be understood that the feed-arm $g$ is so adjusted with relation to the punches that it swings forward and shifts the die-plate when the punches are withdrawn from said die-plate, and while they are at rest or are passing the centers on their return to the die-plate.

Figure 1:
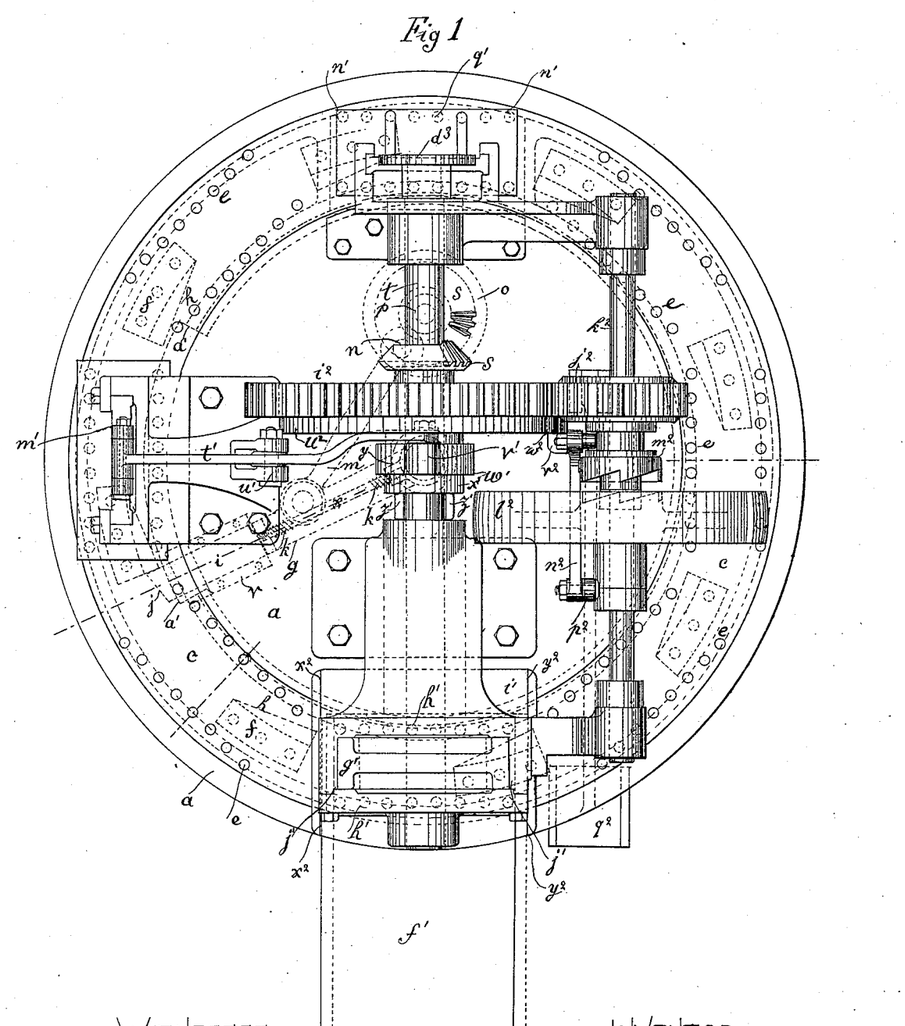
Figure 1 is a plan view of my improved tag making and affixing machine.
Figure 2:
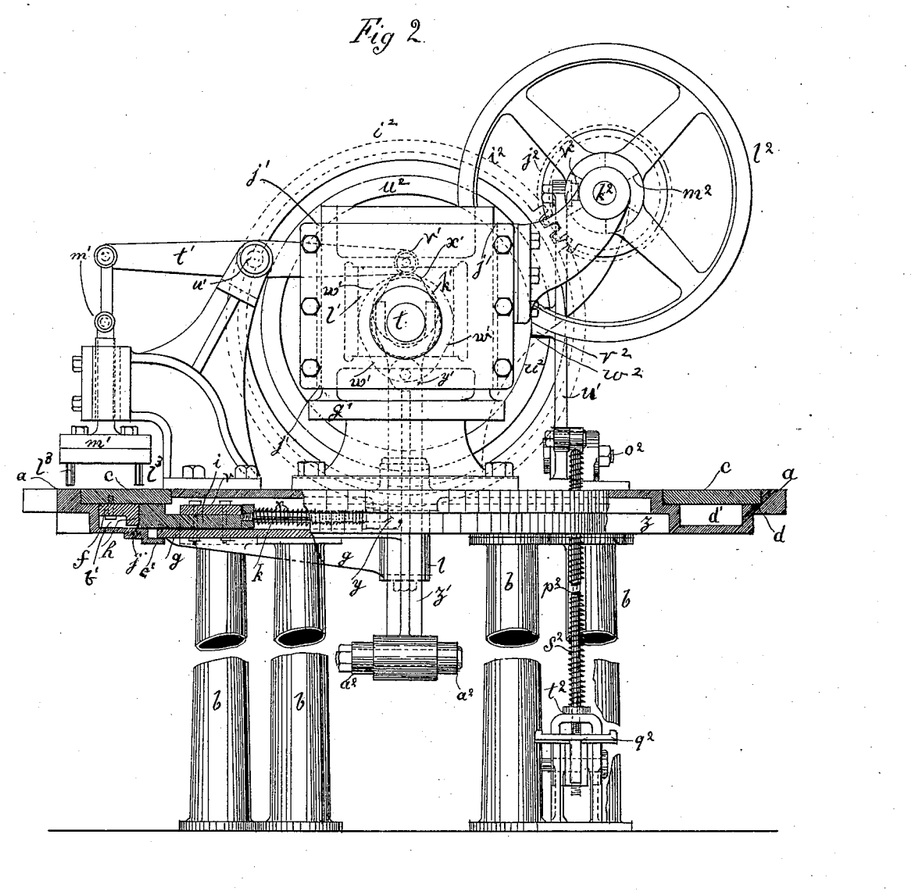
Fig. 2 is a side elevation, looking at the front, of the power-punch by which the tags are cut out of the tin sheet, with some parts in section.
Figure 3:
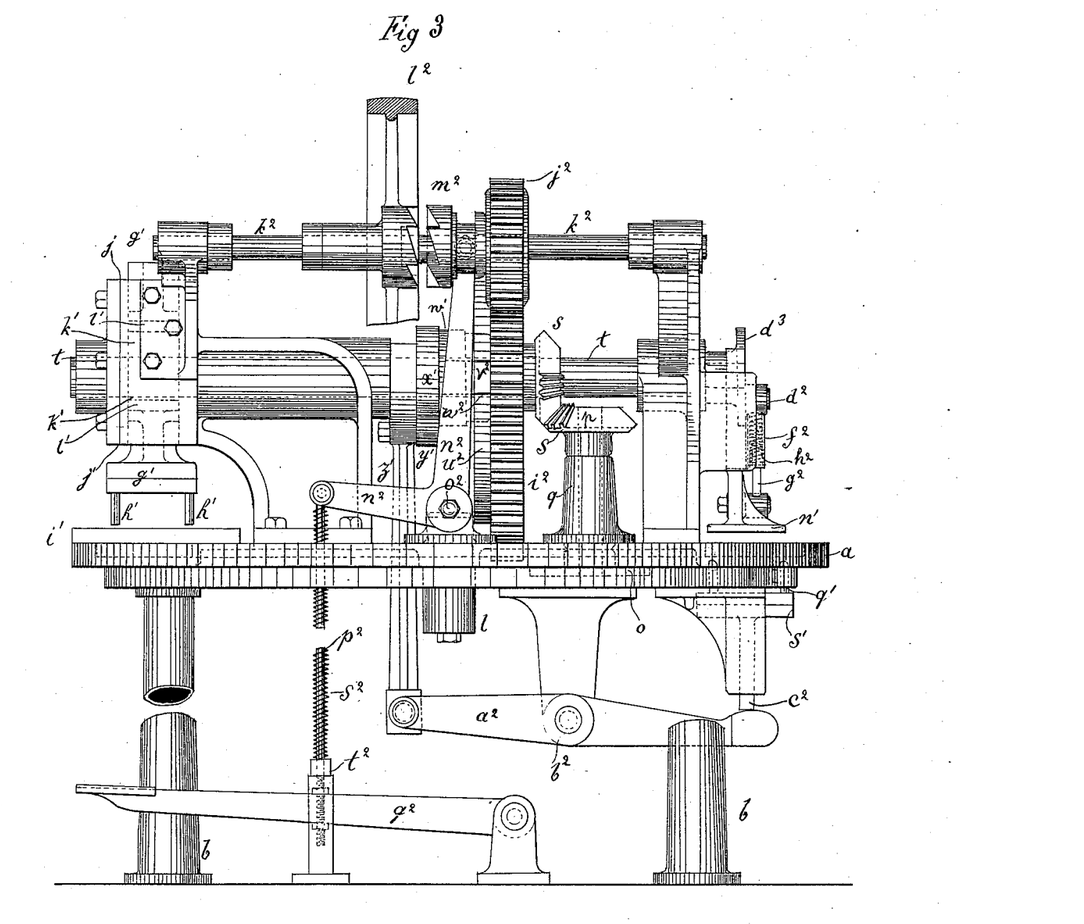
Fig. 3 is a side elevation of the machine in a plane at right angles to that of Fig. 2.
Figure 14:
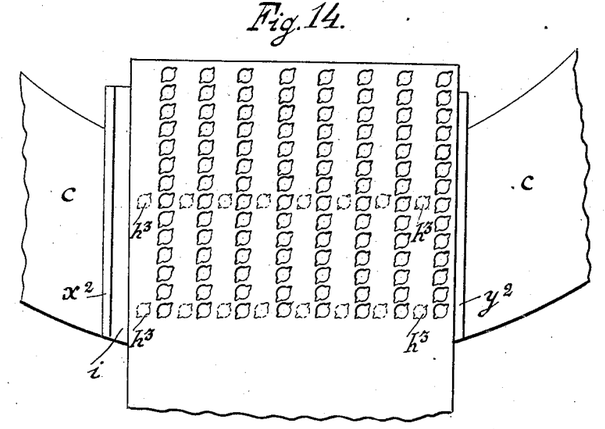

It will be seen that the punches $h'$ and their dies have to be located as far apart along the respective rows as the tags are required to be placed from each other in the tobacco-plugs, in consequence of which the tags are cut out of the tin so far apart that enough metal remains between the holes to make another row of tags, the waste of which it is desirable to avoid; therefore I have located guides $x^2$ and $y^2$ at the respective sides of the die-plate $i'$ about the same distance from the outer die-sockets, $h^3$, as the distance between the said sockets along the rows, and I take tin sheets as much wider than the length of the rows of die-sockets as the distance from the sockets to one of the guides, and about four times longer than the distance between the two rows of punches $h'$, and insert them under both rows of punches to begin with, then feed the sheet forward along guide $x^2$ until the holes made by the outer row of punches reach the inner row of punches, then shift the sheets laterally, as indicated by the dotted lines Fig. 1 and the full lines Fig. 14, a distance equal to the distance between the punch-holes, or thereabout, along the rows and to the guide $y^2$, and then feed the sheet backward or outward along said guide, punching out tags from the blank spaces left between the punches in the first feeding process. The sheet is thus half cut up into tags, and is then reversed endwise and presented again, as before, along guide $x^2$, and fed in until the holes of the front row of punches reach the inner punches. Then the sheet is again shifted laterally to guide $y^2$, as before, and again fed backward or outward along said guide, by which the whole sheet is finally cut up, the punches all working continuously meantime, except while the sheets are being withdrawn and reversed, so that it will be seen that the tags will be made and affixed with great rapidity. I may pull out the sheet at the time of shifting it laterally, and then feed forward, as before, instead of feeding backward; but I prefer to feed it backward.

It will now be readily seen that material economy of time and labor is effected by making the tags in the same machine that is employed in affixing them to the tobacco-plugs, as all intermediate handling, adjusting, and feeding such as would be necessary in a separately-organized affixing-machine are avoided.

In this machine the feeding of the tags from the point-benders to the affixing devices is not to be taken into account as an item of time or labor, because it is effected by the same means and in the same time as the feeding from the tag-cutters to the point-benders is accomplished; but I may produce the tags in a separate punching mechanism, if preferred, and deliver them to the die-plate for a feeder to the tagging mechanism.

Having thus described my invention, what I claim, and desire to secure by Letters Patent, is—

1. An organized plug-tobacco-tagging machine, consisting of an intermittingly-moving annular die-plate tag-feeder and tobacco-plug holder, mechanism for operating said die-plate, a presser for holding the tobacco-plugs, mechanism for operating the presser, punches for inserting the tags, and mechanism for operating the punches, combined and operating substantially as described.

2. An organized tag-making and plug-tobacco-tagging machine, consisting of punching mechanism for cutting the tags, an intermittingly-moving annular die-plate tag-feeder, mechanism for operating said die-plate, point-bending punches, mechanism for operating said punches, a presser for holding the tobacco plugs, mechanism for operating said presser, punches for inserting the tags, and operating mechanism therefor, combined and operating substantially as described.

3. The combination, with a plug-tobacco-tagging presser and punches, of an intermittingly-moving annular die-plate having die-sockets in which the tags are supplied to the said presser and punches, and being arranged with relation to said presser and punches to receive the plugs and hold them while being tagged, and to remove them from between the said presser and punches, substantially as described.

4. In a tag-making and tobacco-tagging machine, the tag-making punches and dies, located as wide apart along the rows of the same as the tags are to be placed apart in the tobacco-plugs, in combination with guides $x^2$ and $y^2$ on the respectives sides of the punching die-plate, and located as far from the ends of the die-rows as the width of the spaces between the punches and dies, or thereabout, substantially as described.

5. The combination, with an intermittingly-moving annular die-plate tag-feeder and tobacco-plug holder, and with a presser and tag-inserting punches and mechanism for operating the same, of punching mechanism arranged for cutting the tags and at the same time delivering them to the die-plate, and mechanism arranged for bending the points of the tags in said die-plate, substantially as described.

6. The means for disconnecting the clutch and stopping the machine in the required position, consisting of the notched ring on the wheel F, in combination with the stud on the clutch-shifting lever and the spring for throwing out the clutch, substantially as described.

In witness whereof I have hereunto signed my name in the presence of two subscribing witnesses.

EUGENE H. PECK.

Witnesses:
W. J. MORGAN,
S. H. MORGAN.